(12) United States Patent
Mallet

(10) Patent No.: US 6,300,958 B1
(45) Date of Patent: Oct. 9, 2001

(54) GLOBAL CONSTRAINED PARAMETERIZATION OF TRIANGULATED SURFACES

(75) Inventor: Jean-Laurent Mallet, Nancy (FR)

(73) Assignee: T-Surf Corp., Houston, TX (US)

( * ) Notice: Subject to any disclaimer, the term of this patent is extended or adjusted under 35 U.S.C. 154(b) by 0 days.

(21) Appl. No.: 09/118,348

(22) Filed: Jul. 17, 1998

(51) Int. Cl.[7] .................................................. G06F 15/00

(52) U.S. Cl. ............................................................ 345/442

(58) Field of Search .................................. 345/430, 428, 345/419, 440, 441, 442, 443

(56) References Cited

U.S. PATENT DOCUMENTS

| | | | |
|---|---|---|---|
| 5,649,079 | * | 7/1997 | Holmes ................................. 345/419 |
| 5,870,101 | * | 2/1999 | Murata et al. ........................ 345/430 |
| 6,040,844 | * | 3/2000 | Yamaguchi et al. ................. 345/430 |

* cited by examiner

*Primary Examiner*—Phu K. Nguyen
(74) *Attorney, Agent, or Firm*—Reidlaw, L.L.C.; John S. Reid

(57) ABSTRACT

Methods and apparatus for mapping a feature onto a simulated surface having contoured portions, the surface being definable by a plurality of generally adjacent triangulations, the surface being further definable by a plurality of intersecting isoparametric curves linking identified values of the feature to identified points on the surface. In one embodiment, the isoparametric curves are characterized in that when the surface is flat, the isoparametric curves intersect one another in a perpendicular manner, and the perpendicularity of the intersections on the contoured portions of the surface is maintained. In another embodiment, the isoparametric curves are characterized in that when the surface is flat. The isoparametric curves are spaced a predetermined distance apart, and the spacing of the intersections on the contoured portions of the surface is maintained. In a third embodiment of the invention, the isoparametric curves are characterized by defined mathematical relationships having a plurality of variables associated with at least the topology of the surface, and at least one of the variables is held constant between isoparametric curves. Preferably, each of the triangulations are characterized by vertices terminating at points on the surface, and the method further includes using the vertices to define a gradient of a mathematical function associated with the feature, which function is interpolated over the triangulated surface.

9 Claims, 10 Drawing Sheets

GLOBAL CONSTRAINED PARAMETERIZATION OF TRIANGULATED SURFACES

TECHNICAL FIELD

The present invention pertains to the field of three dimensional model generation, and more particularly to a method for reducing distortion of a feature when the feature is mapped onto a contoured surface.

BACKGROUND OF THE INVENTION

Texture mapping is widely used to improve the visual richness of 3D surfaces in computer generated images. Each 3D surface is put in correspondence with a planar image through a function called a mapping. Such a mapping assigns a pair of coordinates (u,v) referring to a pixel of the planar image to each point of a surface. Thus, for instance, the latitude and longitude can define a trivial mapping of a sphere. This technique was described by E. Catmull in A Subdivision Algorithm for Computer Display of Curved Surfaces, PhD thesis, Dept. of Computer Sciences, University of Utah, December 1974, which is hereby incorporated by reference. This technique was first applied to bicubic patches using a recursive subdivision algorithm. Unfortunately, these methods often produce highly distorted textures in the resulting images, similar to FIG. 10 (which is not prior art, but is only referred to for illustrative purposes).

First attempts to minimize these distortions were described by R. Darwyn Peachey in Solid Texturing of Complex Surfaces, *SIGGRAPH 85 Conference Proceedings*, volume 19, pages 287–296, ACM, July 1985, and E. Bier and K. Sloan in Two-Part Texture Mapping, *IEEE Computer Graphics and Applications*, pages 40–53, September 1986, both of which are incorporated herein by reference. These attempts involved separating the process into two steps. The texture pattern is first applied to a simple intermediate surface such as a box or a cylinder for which texture mapping is trivial. Then, this intermediate surface is projected on the target object. The choice of the intermediate surface and its orientation, together with the projection method selected, dramatically affect the results, and great deal of user interaction was therefore required.

Marcel Samek, C. Slean, and H. Weghorst in Texture Mapping and Distortions in Digital Graphics, *The Visual Computer*, 2(5):313–320, September 1986, which is hereby incorporated by reference, taught that assigning texture coordinates to any surface is equivalent to flattening it. That method consists of unfolding a polygonal surface from a user selected seed. A similar technique was dislosed by C. Bennis, J. M. V'ezien, and G.Igl'esias in Piecewise Surface Flattening for Non-Distorted Texture Mapping, *SIGGRAPH 91 Conference Proceedings*, volume 25, pages 237–246, ACM, July 1991, which is hereby incorporated by reference. This latter method means a parametric surface may be unfolded by allowing cuts to appear on the mapped texture when the discrepancy of the geodesic curvature goes beyond a given threshold.

Minimizing the distortions induced by texture mapping can be also realized using optimization techniques. In the method described by S. D. Ma and H. Lin in Optimal Texture Mapping, *EUROGRAPHICS'88*, pages 421–428, September 1988, which is incorporated herein by reference, a mapping of any surface is constructed by starting from a grid of points sampled on the surface. The grid is then iteratively optimized by minimizing a global distortion criterion. V. Krishnamurthy and M. Levoy in Fitting Smooth Surfaces to Dense Polygon Meshes, *SIGGRAPH 96 Conference Proceedings*, pages 313–324, ACM, August 1996, and incorporated herein by reference, disclosed a similar approach for converting a triangulated mesh into a set of B-Spline surfaces. It is also possible to construct a mapping by assigning (u,v) coordinates to the vertices of the mesh. This naturally leads to the use of harmonic maps, as described by M. Eck, T. DeRose, T. Duchamp, H. Hoppes, M. Lounsbery and W. Stuetzle in Multiresolution Analysis of Arbitrary Meshes, *SIGGRAPH 95 Conference Proceedings*, pages 173–182, ACM, August 1995, which is hereby incorporated herein by reference. This method consists of minimizing a metric dispersion criterion. Unfortunately, this does not always preserve angles accurately. Another approach disclosed by M. S. Floater in Parametrization and Smooth Approximation of Surface Triangulations, *Computer Aided Geometric Design*, 14(3):231–250, April 1997, and incorporated herein by reference, generalizes the barycentric mapping method described by W. T. Tutte in Convex Representation of Graphs, *Proc. London Math. Soc.*, volume 10, 1960, also incorporated herein by reference. The (u,v) texture coordinates are found to be the solution of a linear system, where each (u,v) point is a convex combination of its neighbors. M. S. Floater (referenced above) taught a method for choosing the coefficients of these convex combinations to mimic the chord length parametrization for curves. These global methods give good results for most simple surfaces, but suffer from several limitations when applied to more complex surfaces. Further, since the criterion to be minimized is integral to the optimization algorithm, it is often difficult to take into account user defined information. For instance, as most surfaces are not developable, distortions will still remain, and the user may want to specify the distribution of these distortions.

Additionally, it is desirable to have a mapping function that handles "cuts" in the surface, such as for example are found when mapping a geological surface, which may represent a faulted stratigraphic grid. One technique for handling this is described by J. Bloomenthal in Modeling the Mighty Maple, *SIGGRAPH 85 Conference Proceedings*, volume 19, pages 305–311, ACM, July 1985. Bloomenthal uses several distinct "patches" on the surface and makes the edges of the patches match to provide continuity of a texture over the discontinuity ("cut"). This is a computationally intense method, and it is desirable to provide a simpler method for dealing with discontinuities along a line in the surface.

Prior interactive mapping methods, where the parametrization is partially or completely defined by the user, are described by H. K. Pedersen in Decorating Implicit Surfaces, *SIGGRAPH 95 Conference Proceedings*, pages 291–300, ACM, 1995, P. Litwinowicz and G. Miller in Efficient Techniques for Interactive Texture Placement, *SIGGRAPH 94 Conference Proceedings*, pages 119–122, ACM, July 1994, and J. Maillot, H. Yahia, and A. Verroust in Interactive Texture Mapping, *SIGGRAPH 93 Conference Proceedings*, volume 27, ACM, 1993, all of which are hereby incorporated herein by reference.

Therefore, what is needed in the art is a method for texture mapping onto a surface which reduces distortion of the texture, and which preferably allows for user input to distribute any remaining distortion to preferred regions. Additionally, it is desirable to have a texture mapping method which is capable of handling discontinuities in the surface.

SUMMARY OF THE INVENTION

The invention discloses a novel global optimization method, and more particularly, a texture mapping method which reduces distortion encountered by prior texture mapping methods. Contrary to the prior art, the method disclosed herein is based on a modular approach enabling the way the mapping is constructed to be customized. For instance, it is possible to tune the perpendicularity and homogeneous spacing of isoparametric curves over the entire surface, thus specifying the surface zones where distortions should be minimized in order of preference. The disclosed method also allows the user to make the mapping respect a set of user specified isoparametric curves. Moreover, the mapping can be made continuous through cuts, hence allowing the mapping of a texture on a complex cut surface in a single step. The method can be extended relatively easily to honor other kinds of linear constraints. All these constraints allow the method to take into account user specified information while being much more automatic than prior interactive mapping methods, where the parametrization is partially or completely defined by the user.

The disclosed method can easily take into account various additional information. For example, it is possible with this method to specify the zones where distortions should be minimized in order of preference, to make a set of isoparametric passes through user specified curves, and to "sew" "cuts" of a surface in texture space. Moreover, the method can be extended by defining new constraints, once these constraints are expressed as linear (or linearizable) relations.

The method can be easily implemented, since it only requires an efficient representation of triangulated meshes, which is provided by most C.A.D. packages. Thus, the algorithm has been integrated as a basic algorithm into a widely used C.A.D. software dedicated to geology, and several methods other than these associated with texture mapping have been developed based on this algorithm, such as unfolding geological layers and performing computations in texture space.

Given a surface represented by a set of adjacent triangles, i.e., a "triangulated surface", one embodiment of the invention comprises a method for building a global parameterization (u(x), v(x)) honoring constraints in a least square sense. By way of example, the method can be used to honor linear constraints by specifying that the isoparametric curves are regularly spaced on the surface. Alternately, the constraint can comprise specifying that the isoparametric curves $C(u_0)$ are orthogonal to the isoparametric curves $C(v_0)$. Another constraint that can be used in the method comprises specifying that an isoparametric curves $C(u_0)$ or $C(v_0)$ are coincident with a given curve which can be drawn on the surface. Yet another constraint that can be used in the method, which is particulalry useful in a "cut" surface (i.e., one comprising discontinuities, particularly curvilinear discontinuities), comprises making the parameterization continuous through the "cut".

The invention can be described as a method for mapping a feature onto a simulated surface having contoured portions, the surface being definable by a plurality of generally adjacent triangulations, the surface being further definable by a plurality of intersecting isoparametric curves linking identified values of the feature to identified points on the surface, the isoparametric curves characterized in that when the surface is flat, the isoparametric curves intersect one another in a perpendicular manner, the method comprising maintaining the perpendicularity of the intersections of at least some of the isoparametric curves on the contoured portions of the surface. This embodiment of the invention may be described as maintaining the orthogonality of the isoparametric curves.

The invention may be further described as a method for mapping a feature onto a simulated surface having contoured portions, the surface being definable by a plurality of generally adjacent triangulations, the surface being further definable by a plurality of intersecting isoparametric curves linking identified values of the feature to identified points on the surface, the isoparametric curves characterized in that when the surface is flat, the isoparametric curves are spaced a predetermined distance apart, the method comprising maintaining the predetermined spaced distance between at least some of the isoparametric curves on the contoured portions of the surface. This embodiment of the invention may be described as maintaining the homogeneous spacing of the isoparametric curves.

The invention may yet further be described as a method for mapping a feature onto a simulated surface, the surface being definable by a plurality of generally adjacent triangulations, the surface being further definable by a plurality of intersecting isoparametric curves linking identified values of the feature to identified points on the surface, the surface characterized by a defined secondary isoparametric curve projected onto the surface, the method comprising aligning at least one of the plurality of isoparametric curves to be coincident with the defined secondary isoparametric curve. This embodiment of the invention may be described as aligning details of the texture to details of the surface by specifying an isoparametric curve, and may be used to locally constrain a mapping (versus a global constraint).

The invention may yet further be described as a method for mapping a feature onto a simulated surface having contoured portions, the surface being definable by a plurality of generally adjacent triangulations, each triangulation be defined by vertices terminating at points on the surface, the surface being further definable by a plurality of intersecting isoparametric curves linking identified values of the feature to identified points on the surface, the surface being characterized by a linear discontinuity such that a point on the surface along the discontinuity may be identified with two vertices of non-adjacent triangulations, the method comprising maintaining the identified value of the feature associated with a point on the surface along the discontinuity at the two both vertices. This embodiment of the invention may be described as mapping two borders of a cut on the surface to the same isoparametric curve, or "sewing" the cut in (u,v) domain space.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Parametrizing a Triangulation

By way of overview, we will first describe the notion of mapping a function defined on a triangulated mesh, as well as a new method for constructing such mapping functions based on an iterative optimization algorithm. We will then describe how these mappings can be optimized in order to minimize the distortions.

In the following description, we wish to be clear about terms. Therefore, we will now provide the following definitions:

By "mapping" we mean any operation which continuously associates a point (u,v) of a parametric 2-dimensional space to a point x(u,v) located on a 3-dimensional surface.

By "global parameterization" of a surface embedded in a 3 dimensional space, we mean any operation which continuously associates any point x on the surface to a point (u(x),v(x)) of a parametric space. Note that this is the inverse of "mapping".

By saying that a given surface is said "parameterized" we mean that there is a given global parameterization associating any point x of this surface to a pair of parameters (u(x),v(x)) of a parametric domain. It should be noticed that several parameterizations can be associated to a given surface.

Given a parameterized surface and a value $u_0$ in the parametric domain, by "isoparametric curve $C(u_0)$", we mean the set of points located on the surface and generated by $x(u_0,v)$ when v varies in the parametric domain.

Given a parameterized surface and a value $v_0$ in the parametric domain, by "isoparametric curve $C(v_0)$", we mean the set of points located on the surface and generated by $x(u,v_0)$ when u varies in the parametric domain.

The Mapping Function $\Phi$ and Discrete Mapping $\phi$

Figure 1:
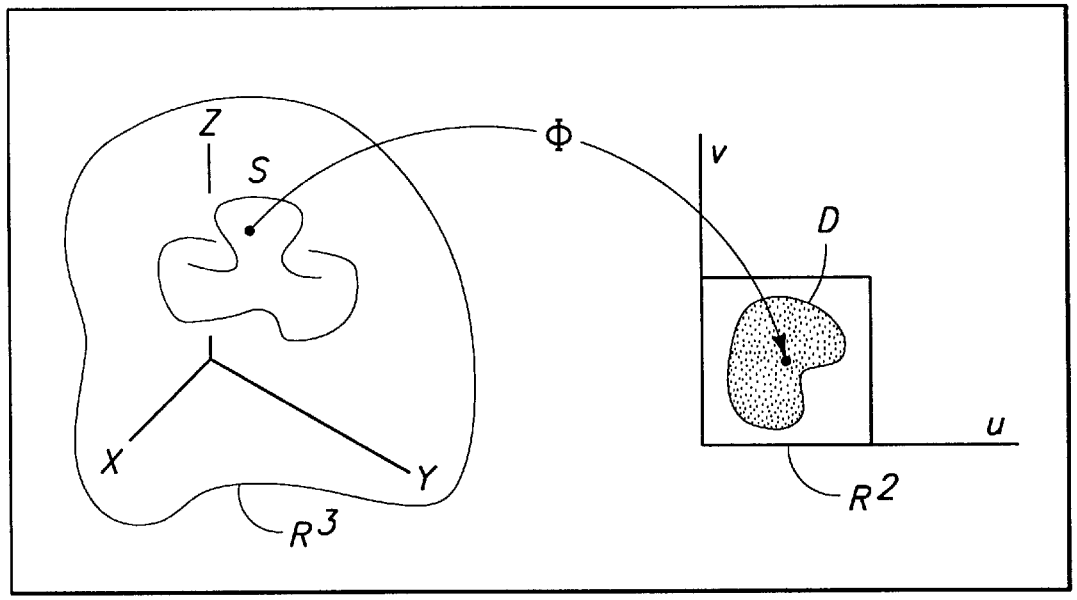
FIG. 1 is a diagram showing mapping $\Phi$ from a surface S of $R^3$ to $D \subset R^2$.

Turning to FIG. 1, the concept of a mapping function, or "mapping", $\Phi$, from a surface S of in three a dimensional region $R^3$ to a domain on a two dimensional region, $D \subset R^2$, is shown. As shown, given an open surface S of $R^3$, a mapping $\Phi$ is a one-to-one transform that maps the surface S to a subset D of $R^2$, and is given by the following formula (Formula 1):

$$(x, y, z) \in S \to \Phi(x, y, z) = \begin{bmatrix} \Phi^u(x, y, z) \\ \Phi^v(x, y, z) \end{bmatrix}$$

wherein the following definitions are given:

D is called the parametric (u,v) domain.

As $\Phi$ is, by definition, a one-to-one function, it has an inverse function $x = \Phi^{-1}$, called a parametrization of the surface, such that the following formula (Formula 2) applies:

$$(u, v) \in \mathcal{D} \to x(u, v) = \Phi^{-1}(u, v) = \begin{bmatrix} x(u, v) \\ y(u, v) \\ z(u, v) \end{bmatrix}$$

If a surface has a parametrization x defined, the inverse $\Phi = x^{-1}$ of this parametrization provides a mapping function. A method of applying this technique to cubic splines is disclosed in A Subdivision Algorithm for Computer Display of Curved Surfaces (E. Catmull), incorporated above, in which a recursive subdivision scheme is described, making it possible to avoid inverting of the parametrization directly. In the following description, the surface S is provided with a triangulation $G = \{\Omega, T\}$, where $\Omega$ is the set of the vertices of the triangulation, and T the set of the triangles of G, defined as vertex triplets. For the sake of simplicity, $\Omega$ will be identified with the interval [1 . . . M] of integers, where $M = |106|$ denotes the number of vertices of the triangulation. The geometric location at a vertex $\alpha \in \Omega$ is denoted as $p(\alpha)$ in the following description.

Figure 2:
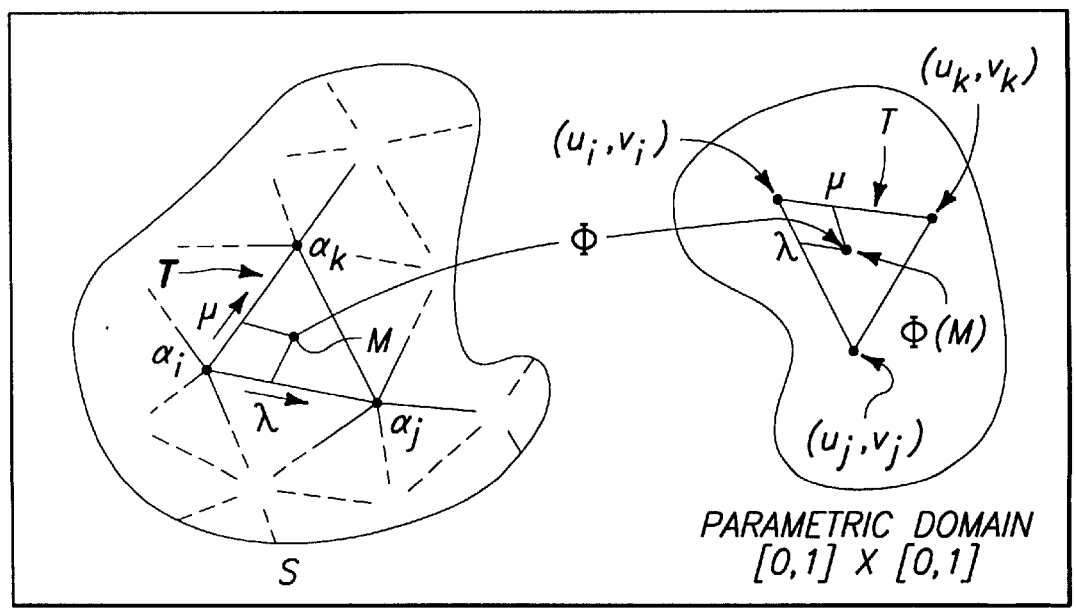
FIG. 2 is a diagram showing mapping the function $\Phi$ interpolated over a triangle.

For surfaces relevant to the invention, we define the value of $\Phi$ at the vertices $\Omega$ of the triangulation G. This information can be stored as a set of $(u_i, v_i)$ values, where $1 \leq i \leq M$. The selection of the values for $(u_i, v_i)$ is explained below. This defines a discrete function $\phi: \Omega \to R^2$ such that $\forall \alpha_i \in \Omega$, $\phi(\alpha_i) = \{\phi^u(\alpha_i), \phi^v(\alpha_i)\} = (u_i, v_i)$. As shown in FIG. 2, a mapping function $\Phi$ can be then defined as the linear interpolation of $\phi$ over each triangle $T = (\alpha_i, \alpha_j, \alpha_k)$ of T. For each point p in T, $\Phi$ is given the following formula (Formula 3):

$$\begin{cases} \Phi(p) &= (1-\lambda-\mu) \cdot \varphi(\alpha_i) \\ &+ \lambda \cdot \varphi(\alpha_j) \\ &+ \mu \cdot \varphi(\alpha_k) \end{cases}$$

where:

$\lambda$ and $\mu$ are the local barycentric coordinates at the point p in T $\phi(\alpha_i)=(u_i, v_i)$; $\phi(\alpha_j)=(u_j, v_j)$; $\phi(\alpha_k)=(u_k, v_k)$ Discrete Smooth Interpolation Given a triangulation $G=\{\Omega, T\}$, we preferably to assign (u, v) coordinates to each vertex $\alpha\in\Omega$. It is known that the following two sufficient conditions construct a mapping:

1. The image of the border of the surface through $\phi$ in the parametric (u, v) domain is a convex polygon; and
2. Each internal node is a convex combination of its neighbors. It is also known that these two conditions are sufficient to define mappings, but are not necessary to define mappings. For example, as demonstrated below, the first condition (concerning the image of the border) can be replaced by a less restrictive condition.

More formally, the second condition (regarding the internal nodes) can be written in the form of the following equation (Equation 1):

$$\forall k \in \Omega, \sum_{\alpha \in N(k)} v^\alpha(k) \cdot \varphi(\alpha) = 0 \qquad (1)$$

where:

N(k) denotes the set of nodes directly connected to k, including k, and the $v^\alpha(k)$ are given coefficients such that the following equation set (Equation 2) applies:

$$\begin{cases} v^\alpha(k) > 0 & \forall \alpha \in N(k) - \{k\} \\ v^k(k) = -\sum_{\substack{\alpha \in N(k) \\ \alpha \neq k}} v^\alpha(k) \neq 0 & \forall k \in \Omega \end{cases} \qquad (2)$$

Once boundary nodes have been mapped to a convex polygon in parametric domain space, (u, v) coordinates are assigned to the internal nodes of the triangulation. Instead of finding $\phi$ by directly solving Equation 1, the method described herein comprises minimizing a global criterion in a least square sense, honoring at the same time a set of linear constraints, as will be shown below. The algorithm is preferably based on the Discrete Smooth Interpolation algorithm (D.S.I.), described in Discrete Smooth Interpolation in Geometric Modeling, *ACM-Transactions on Graphics*, 8(2):121–144, 1989, and Discrete Smooth Interpolation, *Computer Aided Design Journal*, 24(4):263–270, 1992, both by J. L. Mallet, and both incorporated herein by reference. Those publications also describe the notions of generalized roughness, linear constraints, and the iterative D.S.I. algorithm, discussed below. The criterion minimized by the D.S.I. method is called the roughness R ("roughness"), and is defined in Equation 3 below:

$$R(\varphi) = \sum_{k \in \Omega} \sum_{v \in \{u,v\}} \left\{ \sum_{\alpha \in N(k)} v^\alpha(k) \cdot \varphi^v(k) \right\}^2 \qquad (3)$$

The minimum of this functional $R(\phi)$ is reached if $\partial R(\phi)/\partial\phi^\upsilon(\alpha)=0$ for each $\alpha\in\Omega$ and for each $\upsilon\in\{u, v\}$, where $\upsilon$ denotes one of the two components of $\phi$. This yields the following equation (Equation 4):

$$\varphi^v(\alpha) = -\frac{G^v(\alpha \mid \varphi)}{g^v(\alpha)} \qquad (4)$$

where:

$$\begin{vmatrix} G^v(\alpha \mid \varphi) &= \sum_{k \in N(\alpha)} \left\{ v^\alpha(k) \cdot \sum_{\substack{\beta \in N(k) \\ \beta \neq \alpha}} v^\beta(k) \cdot \varphi^v(\beta) \right\} \\ g^v(\alpha) &= \sum_{\alpha \in N(\alpha)} \{v^\alpha(k)\}^2 \end{vmatrix}$$

The following algorithm (Algorithm 1) computes iteratively the assignments of (u, v) coefficients minimizing the roughness given in Equation 3. It is known that Algorithm 1 converges to a unique solution as soon as at least one node $\alpha$ has its value $\phi(\alpha)$ fixed, and provided that the chosen $v^\alpha(k)$ coefficients honor Equation 2. As described further below, this method can be enhanced using D.S.I. constraints.

Algorithm 1:

let $I$ be the set of nodes where $\varphi$ is unknown let $\varphi_{[0]}$ be a given initial approximated solution while (more iterations are needed){ for_all ($\alpha \in I$){ for_all($v \in \{u, v\}$){

$$\varphi^v(\alpha) := -\frac{G^v(\alpha)}{g^v(\alpha)}$$

}

}

}

Where the $v^\alpha(k)$ coefficients are concerned, several choices are available. One possible choice is referred to as the shape preserving weighting, and is described in Parametrization and Smooth Approximation of Surface Triangulations (M. S. Floater, referenced and incorporated above). This type of weighting ensures that the location of a vertex in parametric space relative to its neighbors mimics the local geometry around the vertex being considered. By separating the criteria minimizing the distortions from those which ensure that a valid mapping is constructed, we can obtain a finer control on the way the surface is parametrized. For this reason, the simple harmonic weighting defined by the following formula (Formula 4) is used for the $\{v^\alpha(k)\}$:

$$v^\alpha(k) = \begin{cases} 1 & \text{if } \alpha \in N(k) - \{k\} \\ -\text{degree}(k) & \text{if } \alpha = k \end{cases}$$

where degree(k) denotes the number of neighbors of k. Less preferably, one of the previously mentioned weightings such as the shape preserving or gaussian weightings can be used instead, since they both satisfy Equation 2, but as described below, by using linear constraints, the same effect can be obtained with higher flexibility.

NON-DISTORTED MAPPING

Figure 3A:
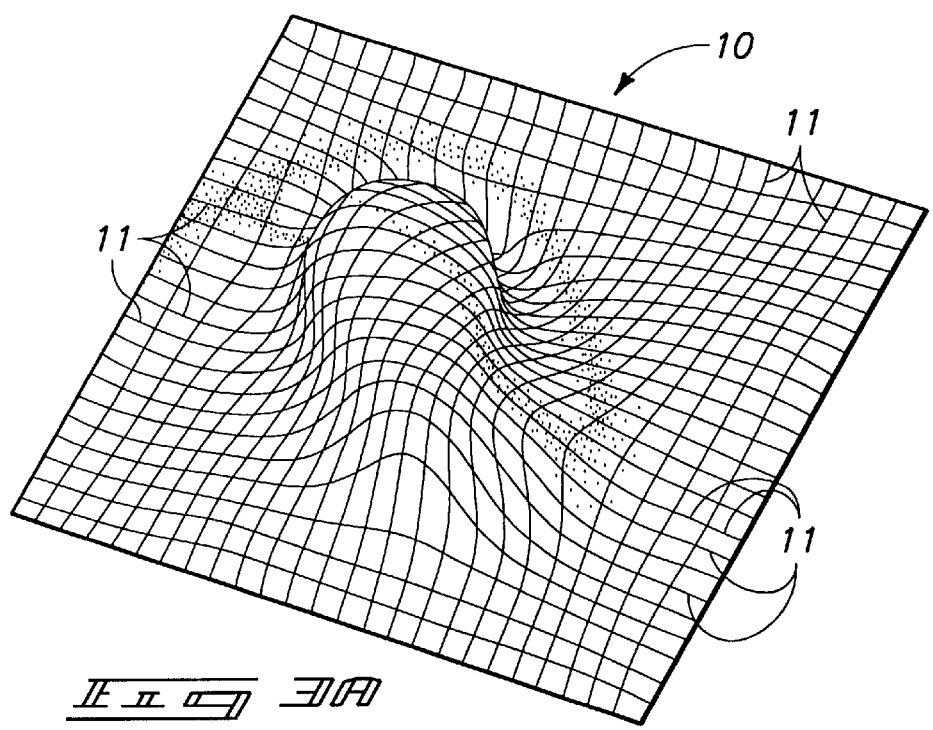
FIG. 3A is a representation of a three dimensional, contoured surface showing isoparametric curves obtained without non-distorted constraints.
Figure 3B:
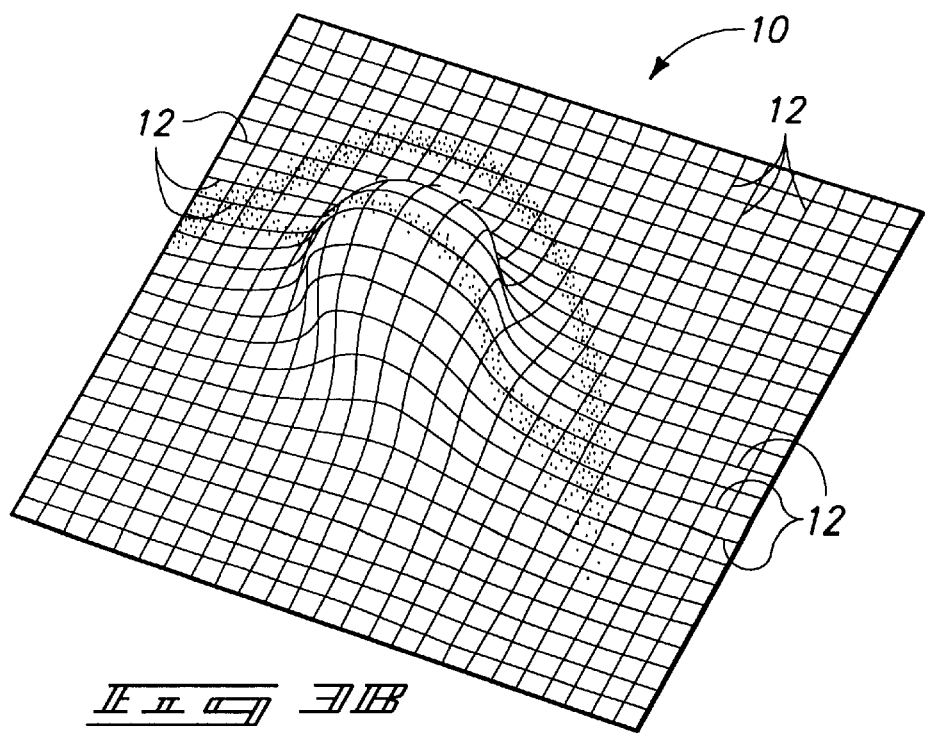
FIG. 3B is a representation of a three dimensional, contoured surface showing isoparametric curves obtained with non-distorted constraints.

We will now describe the criterion to be minimized in order to construct a texture mapping having reduced distortion, which will be referred to further herein as a "non-distorted texture mapping", although it will be appreciated that some distortion may still be present, although the distortion will generally be much reduced over mappings performed by prior methods. In an overview of the method, this criterion preserves the perpendicularity and constant spacing of the isoparametric curves traced on the surface. In other words, the gradients of u and v should be perpendicular one to another and constant all over the surface. This is clearly demonstrated in FIGS. 3A and 3B. FIG. 3A shows a surface 10 having isoparametric curves (shown by representative lines 11) obtained without non-distortion constraints, while FIG. 3B shows a surface 10 having isoparametric curves (shown by representative lines 12) obtained with non-distortion constraints. FIG. 3B clearly shows more even spacing of the grid lines and the cells, and the perpendicularity of the grid lines, while FIG. 3B shows irregular spacing and a high frequency of non-perpendicular grid lines. To accomplish such non-distortion, we define the gradient of a function interpolated over a triangulated mesh from the vertices of the triangulation, as described more fully below. Modification of Algorithm 1 to account for the non-distortion criterion will also be more fully described below.

Data in FIG. 3 shows the effect of the constraints described in this section as applied while parametrizing a triangulated mesh. The isoparametric curves obtained when applying Algorithm 1 are shown in FIG. 3A, whereas the constraints described further below give the result shown in FIG. 3B.

Gradient of a Discrete Function $\phi$ Interpolated over a Triangulation G

Figure 4:
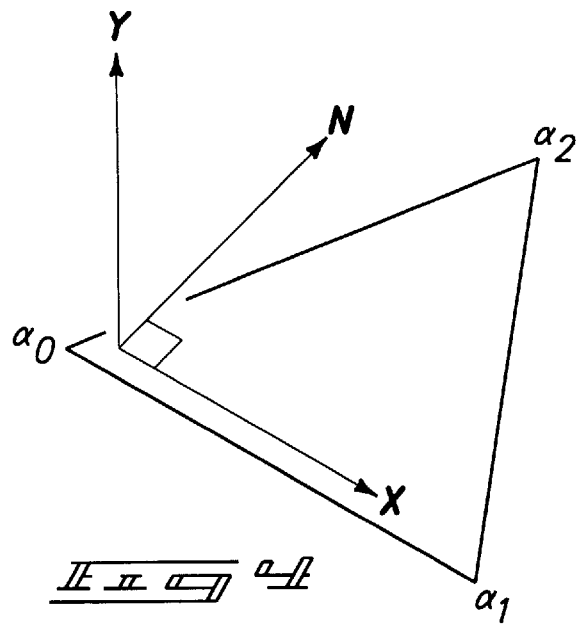
FIG. 4 is a diagram showing the local orthonormal basis (X, Y) of a triangle $T=(\alpha_0, \alpha_1, \alpha_2)$.

As shown in FIG. 4 (and reproduced in the text following this paragraph), each triangle $T=(\alpha_0,\alpha_1,\alpha_2)$ of T can be provided with a local orthonormal basis $(p(\alpha_0), X, Y)$. The function $\phi^v_T(X,Y)$ denotes the linear interpolation of $\phi$ over the triangle T, where $v \in \{u, v\}$ represents one of the two components of $\phi$ and where (X,Y) are the local coordinates in the orthonormal basis $(p(\alpha_0), X, Y)$ of T. The following three formulaes, which are representative of vector quantities and correlate to FIG. 5, shall collectively be known as "Formula 5".

$$X = \frac{p(\alpha_1) - p(\alpha_0)}{\|p(\alpha_1) - p(\alpha_0)\|}$$

$$N = \frac{X \times \{p(\alpha_2) - p(\alpha_0)\}}{\|X \times \{p(\alpha_2) - p(\alpha_0)\}\|}$$

In this ortho normal basis, it is possible to confirm that the gradient of $\phi^v_T(X, Y)$ is constant over T and is a linear combination of the values of ($\phi^v_T$ at the three vertices of the triangle T. The six coefficients $D_x(\alpha_j)$ and $D_y(\alpha_j)$ given in Equation 5 below are solely dependent on the geometry of the triangle T.

$$\begin{vmatrix} \frac{\partial \varphi^v_T}{\partial X} = \sum_{j=0}^{2} D_X(\alpha_j) \cdot \varphi^v(\alpha_j) \\ \frac{\partial \varphi^v_T}{\partial Y} = \sum_{j=0}^{2} D_Y(\alpha_j) \cdot \varphi^v(\alpha_j) \end{vmatrix} \quad (5)$$

$$\text{where:} \begin{cases} D_X(\alpha_0) = (y_1 - y_2)/d \\ D_X(\alpha_1) = (y_2 - y_0)/d \\ D_X(\alpha_2) = (y_0 - y_1)/d \\ D_Y(\alpha_0) = (x_2 - x_1)/d \\ D_Y(\alpha_1) = (x_0 - x_2)/d \\ D_Y(\alpha_2) = (x_1 - x_0)/d \\ d = (x_1 - x_0) \cdot (y_2 - y_0) - (x_2 - x_0) \cdot (y_1 - y_0) \\ y_j = (p(\alpha_j) - p(\alpha_0)) \cdot Y \\ x_j = (p(\alpha_j) - p(\alpha_0)) \cdot X \end{cases} \forall j \in \{0, 1, 2\}$$

Using the definition given in Equation 5 of the gradient of $\phi$, we can write the equations corresponding to the orthogonality and homogeneous spacing of the isoparametric curves. The orthogonality of the iso-u and iso-v curves in a triangle T is given by the following Equation 6 as:

$$\begin{bmatrix} \frac{\partial \varphi^u_T}{\partial X} & \frac{\partial \varphi^u_T}{\partial Y} \end{bmatrix} \cdot \begin{bmatrix} \frac{\partial \varphi^v_T}{\partial X} \\ \frac{\partial \varphi^v_T}{\partial Y} \end{bmatrix} = 0 \quad (6)$$

If we consider that $\phi^u$ is fixed and that $\phi^v$ is to be determined, replacing in Equation 6 the gradient of $\phi^v$ with its expression given in Equation 5 yields the following equation (Equation 7), which linearly combines the values of $\phi^v$ at the three vertices $(\alpha_0, \alpha_1, \alpha_2)$ of T. The equation to be used when $\phi^u$ is interpolated can be obtained by exchanging u and v in Equation 7.

$$\sum_{j \in \{0,1,2\}} \left\{ \varphi^v(\alpha_j) \cdot \left( \frac{\partial \varphi^u_T}{\partial X} \cdot D_X(\alpha_j) + \frac{\partial \varphi^u_T}{\partial Y} \cdot D_Y(\alpha_j) \right) \right\} = 0 \quad (7)$$

Figure 5:
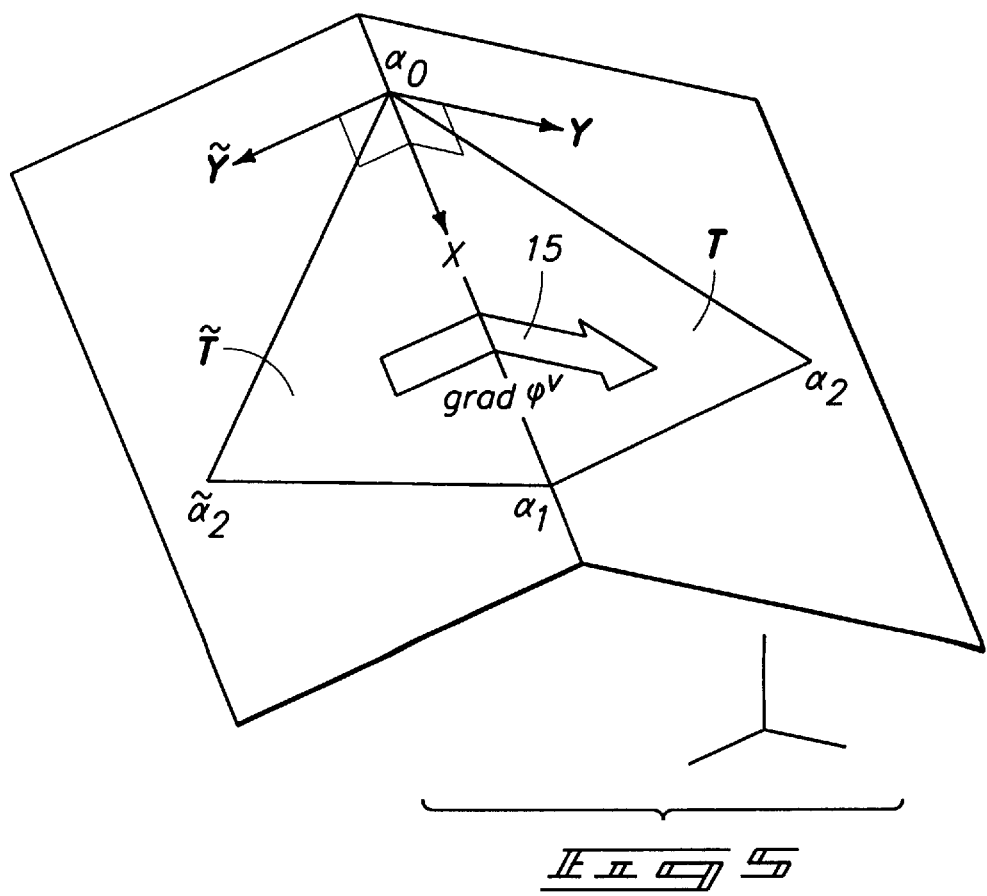
FIG. 5 is a diagram showing a constant gradient across the common edge of two triangles T and $\tilde{\tau}$.

The remaining condition on $\phi$ concerns the homogeneous spacing of the isoparametric curves. In other words, the gradient must not vary from one triangle to another. This requires that a common basis for two adjacent triangles T and $\tilde{T}$ be defined, as shown in FIG. 5 wherein the gradient 15 is indicated as being the same for both T and $\tilde{T}$. The same expressions as introduced in FIG. 4 and Formula 5 apply for FIG. 5. The vector X is shared by the two bases, and $\tilde{Y}$ is such that Y and $\tilde{Y}$ would become colinear if the pair of triangles (T, $\tilde{T}$) were unfolded along their common edge $[\alpha_0, \alpha_1]$.

The homogeneous spacing of the isoparametric curves is verified if, and only if, for each edge of T the equation below (Equation 8) is verified:

$$\begin{cases} \frac{\partial \varphi^u_T}{\partial X} = \frac{\partial \varphi^u_{\tilde{T}}}{\partial X}; \frac{\partial \varphi^u_T}{\partial Y} = -\frac{\partial \varphi^u_{\tilde{T}}}{\partial \tilde{Y}} \\ \frac{\partial \varphi^v_T}{\partial X} = \frac{\partial \varphi^v_{\tilde{T}}}{\partial X}; \frac{\partial \varphi^v_T}{\partial Y} = -\frac{\partial \varphi^v_{\tilde{T}}}{\partial \tilde{Y}} \end{cases} \quad (8)$$

By replacing in Equation 8 the gradients of $\phi^u$ and $\phi^v$ by their expressions in T and $\tilde{T}$, the following four linear equations concerning the two components X and Y of the gradients of $\phi^u$ and $\phi^u$ are obtained (collectively, Equation 9). The term $\delta_W$ takes into account the fact that Y and $\tilde{Y}$ point in an opposite direction.

$$\forall v \in \{u, v\}, \\ \forall W \in \{X, Y\}, \begin{vmatrix} \varphi^v(\alpha_0) \cdot \{D_W(\alpha_0) + \delta_W \cdot \tilde{D}_W(\alpha_0)\} + \\ \varphi^v(\alpha_1) \cdot \{D_W(\alpha_1) + \delta_W \cdot \tilde{D}_W(\alpha_1)\} + \\ \varphi^v(\alpha_2) \cdot \{D_W(\alpha_2)\} + \\ \varphi^v(\tilde{\alpha}_1) \cdot \{\delta_W \cdot \tilde{D}_W(\tilde{\alpha}_2)\} \end{vmatrix} = 0 \quad (9)$$

where $\delta_W = \begin{cases} -1 & \text{if } W = X \\ +1 & \text{if } W = Y \end{cases}$ Honoring Linear Constraints As described above, D.S.I. can be used to construct a mapping of a triangulated mesh. We next want to take into account the two principle criteria minimizing the distortions of the mapping, namely the perpendicularity and homogeneity criteria previously discussed. These two criteria can be written as a set of linear equations. As it is not possible to honor these constraints for a non-developable surface, they will be respected in a least square sense, thus minimizing the distortions. The general form of such a constraint is given in Equation 10 below:

$$\sum_{\alpha \in \Omega} \{A_{c^v}(\alpha) \cdot \varphi^v(\alpha)\} = b_{c^v} \quad (10)$$

where the values $A_{c^v}(\alpha)$ and the scalar $b_{c^v}$ are constant given coefficients defining the constraint c.

Equation 7, corresponding to the perpendicularity of the isoparametric curves in the triangle $T=(\alpha_0, \alpha_1, \alpha_2)$, yields two constraints, $c_T^u$ and $c_T^v$, to be honored when interpolating $\phi^u$ and $\phi^v$ respectively. The expression of $c_T^v$ is given below in Equation 11 following. The expression of the twin constraint $c_T^u$ can be obtained by permuting u and v in this Equation 11.

$$\begin{vmatrix} \forall j \in \{0, 1, 2\}, A_{c_T^v}(\alpha_j) = \frac{\partial \varphi_T^u}{\partial X} \cdot D_X(\alpha_j) + \frac{\partial \varphi_T^u}{\partial Y} \cdot D_Y(\alpha_j) \\ \forall \alpha \notin \{\alpha_0, \alpha_1, \alpha_2\}, A_{c_T^v}(\alpha) = 0 \\ b_{c_T^v} = 0 \end{vmatrix} \quad (11)$$

The homogeneity criterion specified by Equation 9 can be expressed by the following four constraints $c^{uX}_E$, $c^{uY}_E$, $c^{vX}_E$ and $c^{vY}_E$ yielded by Equation 12 below, to be taken into account at each edge $E=(\alpha_0, \alpha_1)$ of the triangulation G. The vertices $\alpha_2$ and $\tilde{\alpha}_2$ denote the two remaining vertices of the two triangles T and $\tilde{T}$ sharing the edge E.

$$\begin{vmatrix} A_{c_E^{vW}}(\alpha_0) = \{D_W(\alpha_0) + \delta_W \cdot \tilde{D}_W(\alpha_0)\} \\ A_{c_E^{vW}}(\alpha_1) = \{D_W(\alpha_1) + \delta_W \cdot \tilde{D}_W(\alpha_1)\} \\ A_{c_E^{vW}}(\alpha_2) = D_W(\alpha_2) \\ A_{c_E^{vW}}(\tilde{\alpha}_2) = \delta_W \cdot \tilde{D}_W(\tilde{\alpha}_2) \\ A_{c_E^{vW}}(\alpha) = 0 \forall \alpha \notin \{\alpha_0, \alpha_1, \alpha_2, \tilde{\alpha}_2\} \\ b_{c_E^{vW}} = 0 \end{vmatrix} \quad (12)$$

where:

$$v \in \{u, v\}; W \in \{X, Y\}; \delta_W = \begin{cases} -1 & \text{if } W = X \\ +1 & \text{if } W = Y \end{cases}$$

The roughness criterion which D.S.I. minimizes can be generalized in order to honor a set C of linear constraints in a least square sense. Here, the set C of constraints is given by Equation 13 (following), where E denotes the set of the edges of the triangulation $G(\Omega, T)$.

$$C = \left( \bigcup_{T \in \mathcal{T}} \{c_T^u, c_T^v\} \right) \cup \left( \bigcup_{E \in \mathcal{E}} \{c_E^{uX}, c_E^{uY}, c_E^{vX}, c_E^{vY}\} \right) \quad (13)$$

The generalized roughness $R^*(\phi)$, taking into account the degree of violation of the constraints C, is given by Equation 14 below. In addition to the equation of the roughness given in Equation 3, several terms correspond to the linear constraints, as described further below.

$$R^*(\varphi) = R(\varphi) + \phi \cdot \sum_{c \in C} \varpi_c \cdot \left\{ \left( \sum_{v \in \{u, v\}} \sum_{\alpha \in \Omega} A_c^v(\alpha) \cdot \varphi^v(\alpha) \right) - b_c \right\}^2 \quad (14)$$

In Equation 14, the term $R(\phi)$ is the roughness (see Equation 3), and the second term represents the degree of violation of the linear constraints. Each constraint c is weighted by a given $\omega_c > 0$ coefficient, allowing to tune the relative importance of the constraints. For example, it is possible to make the mapping respect the perpendicularity rather than the homogeneity. Moreover, since each triangle T and edge E has an individual constraint defined, as well as an individual associated $\omega_c$ coefficient, it is possible to select the surface zones where the distortions are to be minimized in order of preference. The remaining coefficient $\phi \in [0, +\infty]$ is a given parameter called the fitting factor and representing the importance of the constraints relative to the roughness.

The functional $R^*(\phi)$ is a quadratic form, whose minimum is reached if $\partial R^*(\phi)/\partial \phi^v(\alpha) = 0$ for each $v \in \{u, v\}$ and for each $\alpha \in \Omega$. This yields the following equations (Equation 15–17), which solution minimizes $R^*(\phi)$:

$$\varphi^v(\alpha) = -\frac{G^v(\alpha|\varphi) + \phi \cdot \Gamma^v(\alpha|\varphi)}{g^v(\alpha) + \phi \cdot \gamma^v(\alpha)} \quad (15)$$

$$\begin{vmatrix} \Gamma^v(\alpha|\varphi) = \sum_{c \in C} \varpi_c \cdot \Gamma_c^v(\alpha|\varphi) \\ \gamma^v(\alpha) = \sum_{c \in C} \varpi_c \cdot \gamma_c^v(\alpha) \end{vmatrix} \quad (16)$$

with:

$$\begin{cases} \gamma_c^v(\alpha) = (A_c^v(\alpha))^2 \\ \Gamma_c^v(\alpha|\varphi) = A_c^v(\alpha) \cdot \left\{ \sum_{\beta \neq \alpha} A_c^v(\beta) \cdot \varphi^v(\beta) - b_c \right\} \end{cases} \quad (17)$$

The orthogonality constraint can be modified in the iterative D.S.I. algorithm. The two internal loops iterating on the components of $\phi$ and on the nodes of $\Omega$ respectively have been inverted. At each iteration, $\phi^u$ is interpolated while $\phi^v$ is considered to be constant, then the roles of $\phi^u$ and $\phi^v$ are permuted. The resulting algorithm given below (Algorithm 2) assigns (u, v) coordinates to the vertices of the triangulation while respecting the specified set of constraints.

let $I$ be the set of nodes where $\varphi$ is unknown let $\varphi_{[0]}$ be a given initial approximated solution while (more iterations are needed){ for_all($\nu \in \{u, v\}$){ for_all($\alpha \in I$){

$$\varphi^\nu(\alpha) := -\frac{G^\nu(\alpha) + \Gamma^\nu(\alpha|\phi)}{g^\nu(\alpha) + \gamma^\nu(\alpha)}$$

}

}

}

LOCALLY CONSTRAINING A MAPPING

The constraints defined and described so far herein provide a user of the method with a global control on the mapping function. Even if the orthogonality and perpendicularity constraints can be weighted locally to specify the zones where distortions are preferably to be minimized, this may be not sufficient for some applications, where a more precise set of local constraints is required. For example, it may be desirable to align some details of textures with details of models, which can be achieved by specifying isoparametric curves. Moreover, the model to be texture mapped can present cuts, and the user may want to define a single mapping function for a cut model instead of "sewing together" several patches. This desire can be fulfilled by making the mapping continuous through cuts, as will be described further below.

Specifying an Isoparametric Curve

Figure 6:
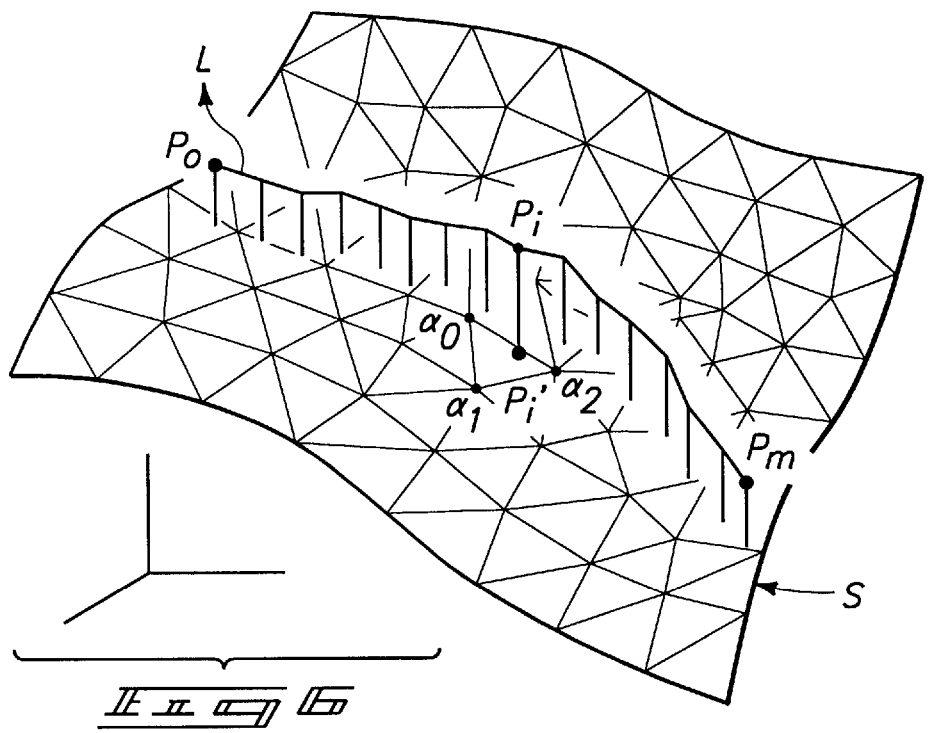
FIG. 6 is a diagram showing the aligning details of the texture to details of the three dimensional model by specifying an isoparametric curve.

As shown in FIG. 6, which shows the aligning details of the texture to the details of the model by specifying an isoparametric curve, we consider that we have a given polygonal curve $L=\{P_0, \ldots P_m\}$ associated with a given value $u_0$ of the parameter u. We will now describe the constraints to be honored for making the isoparametric of the mapping defined by ($u=u_0$) correspond to the projection of L on the surface S. Each point $p_i$ of L yields a constraint $c_{pi}$ ensuring that the isoparametric curve $u=u_0$ of the mapping $\phi$ passes near the projection $p'_i$ of $p_i$ on S.

The triangle $T=(\alpha_0, \alpha_1, \alpha_2)$ is the triangle of S of FIG. 6 that contains $p'_i$, and $(\lambda_0, \lambda_1, \lambda_2)$ are the barycentric coordinates of $p'_i$ in T. The linear relation to be honored is given in Equation 18 below:

$$\left| \begin{array}{l} \sum_{j \in \{0,1,2\}} \lambda_j \cdot \varphi^u(\alpha_j) = u_0 \\ \text{where:} \begin{cases} \sum_{j \in \{0,1,2\}} \lambda_j \cdot p^u(\alpha_j) = p'_i \\ \sum_{j \in \{0,1,2\}} \lambda_j = 1 \end{cases} \end{array} \right. \quad (18)$$

Equation 19 below gives the expression of the constraint $c_{pi}$ in the form of Equation 10. Such a constraint per point $p_i$ is added to the set C to be honored by D.S.I., described above.

$$\begin{cases} A_{c_{p_i}}(\alpha_j) = \lambda_j & \forall j \in \{0, 1, 2\} \\ A_{c_{p_i}}(\alpha_j) = 0 & \forall \alpha \notin \{\alpha_0, \alpha_1, \alpha_2\} \\ A_{c_{p_i}}(\alpha_j) = u_0 \end{cases} \quad (19)$$

As described above, the two following sufficient conditions ensure that a discrete function $\phi$ defines a mapping:

The image of the border of the surface through $\phi$ in the parametric (u, v) domain is a convex polygon; and Each internal node is a convex combination of its neighbors.

Figure 7:
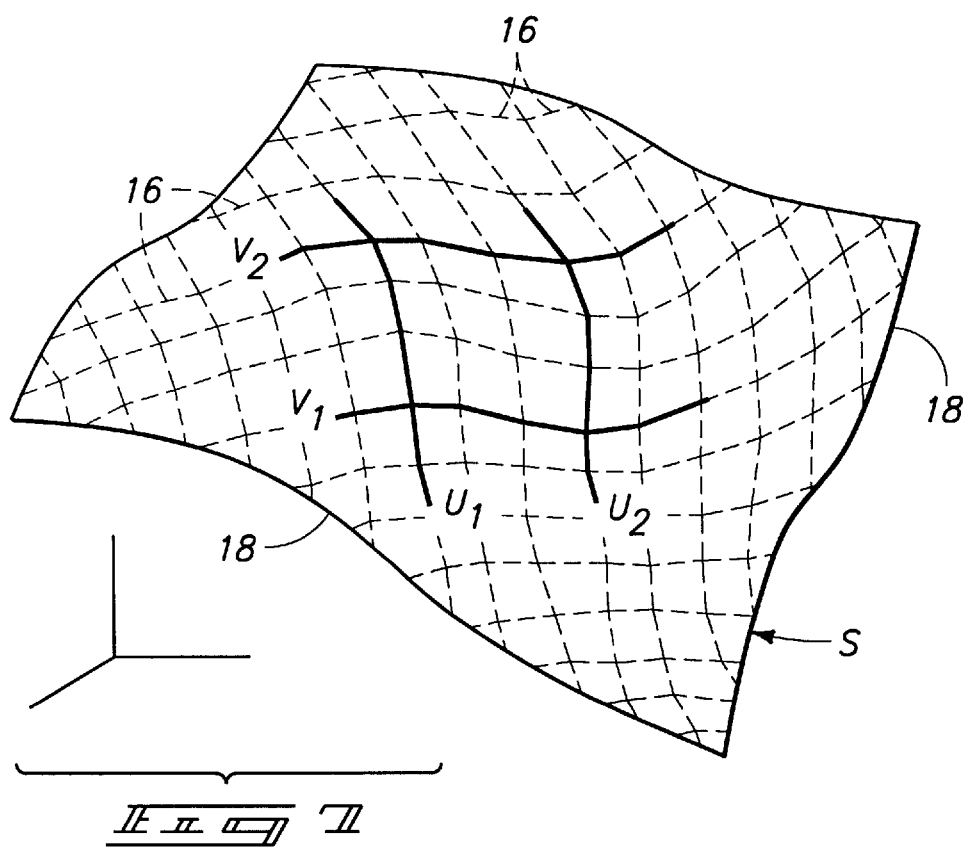
FIG. 7 is a diagram showing extrapolating a mapping onto a three dimensional, contoured surface from four user specified isoparametric curves.

Introducing the constraints to ensure that the isoparametric curves are orthogonal, with homogeneous spacing techniques the first condition can be replaced by a less restrictive one. As shown in FIG. 7, it is then sufficient for a user to specify four arcs of isoparametric curves $\{u_1, u_2, v_1, v_2\}$ using the constraint previously introduced to extrapolate a mapping on the surface S, as indicated by the dashed exemplary lines 16. Thus, by using the algorithm not only as an interpolator, but also as an extrapolator, it is possible to construct mappings for surfaces having complex shaped borders 18 by leaving $\phi$ unspecified on the border.

Constructing a Mapping for a Cut Surface

Figure 8:
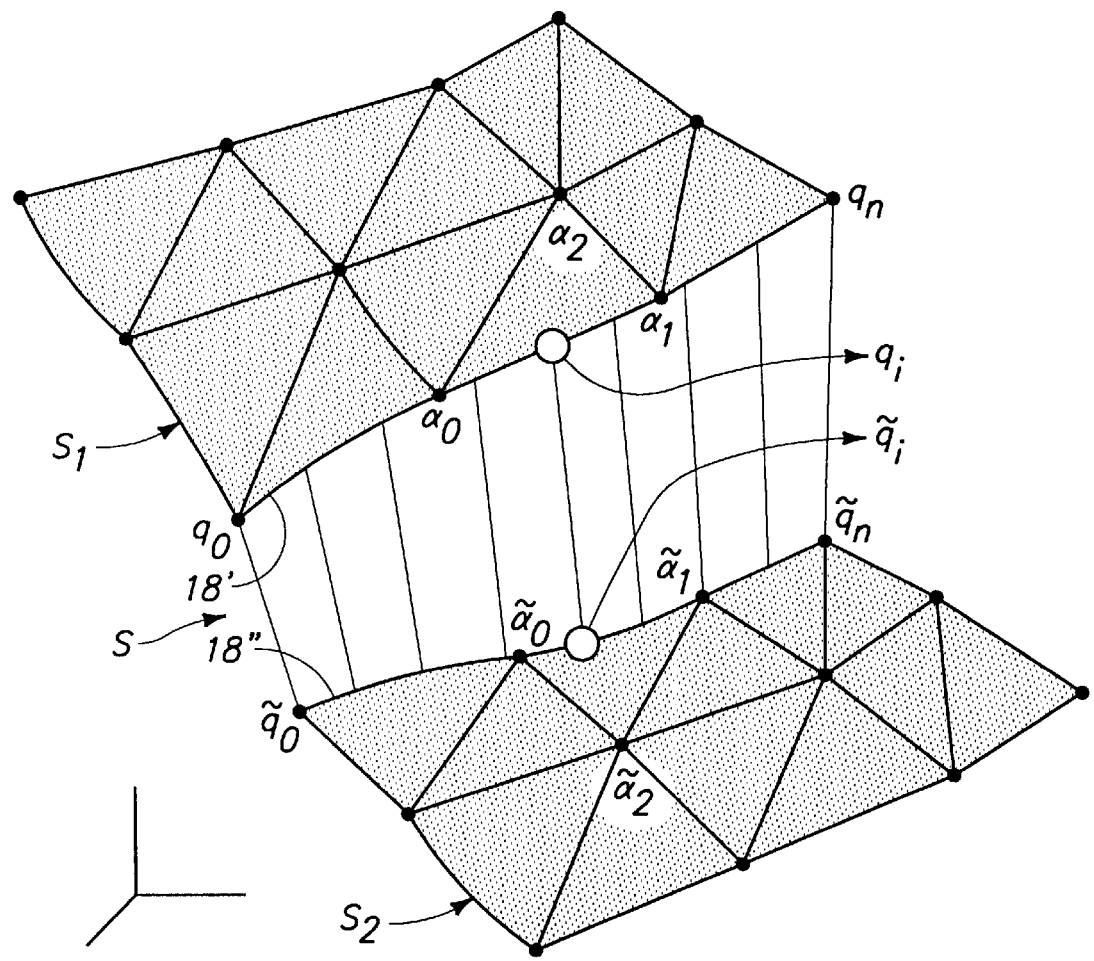
FIG. 8 is a diagram showing how two borders of a three dimensional, contoured cut surface can be connected in texture-space.
Figure 13:
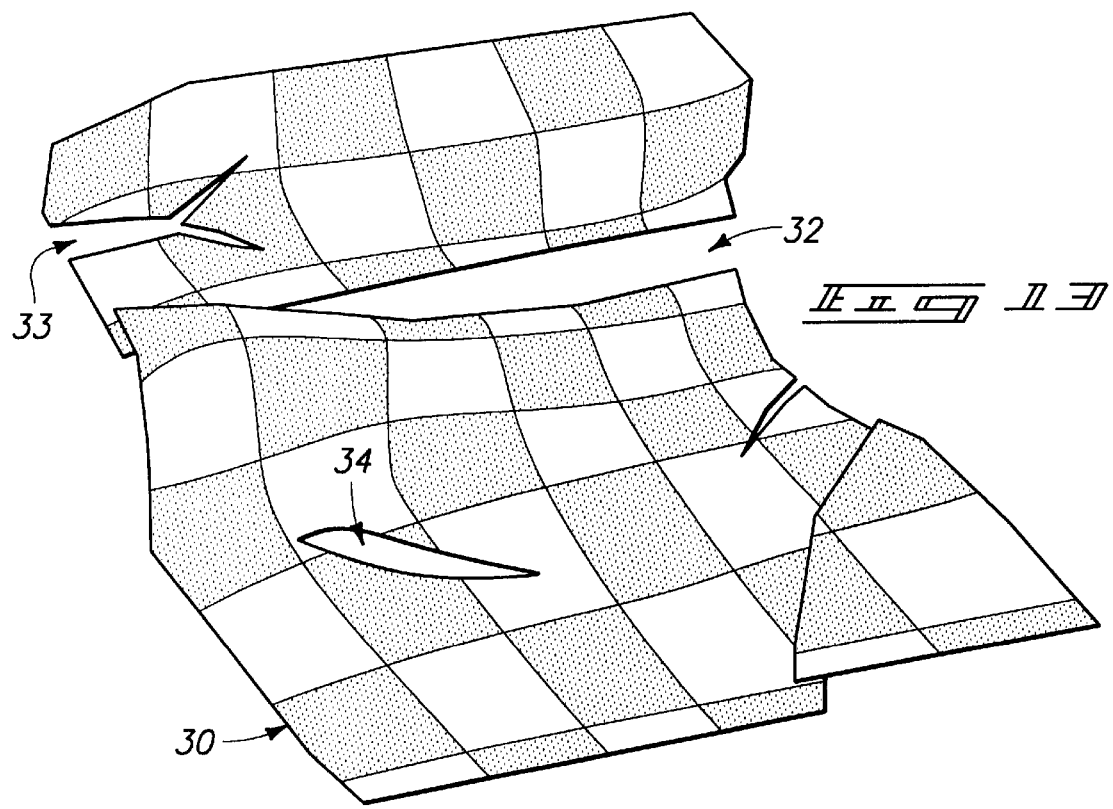
FIG. 13 is a diagram showing a texture mapped over a three dimensional, cut contoured surface such as might be used to represent a faulted stratigraphic geological layer.
Figure 14:
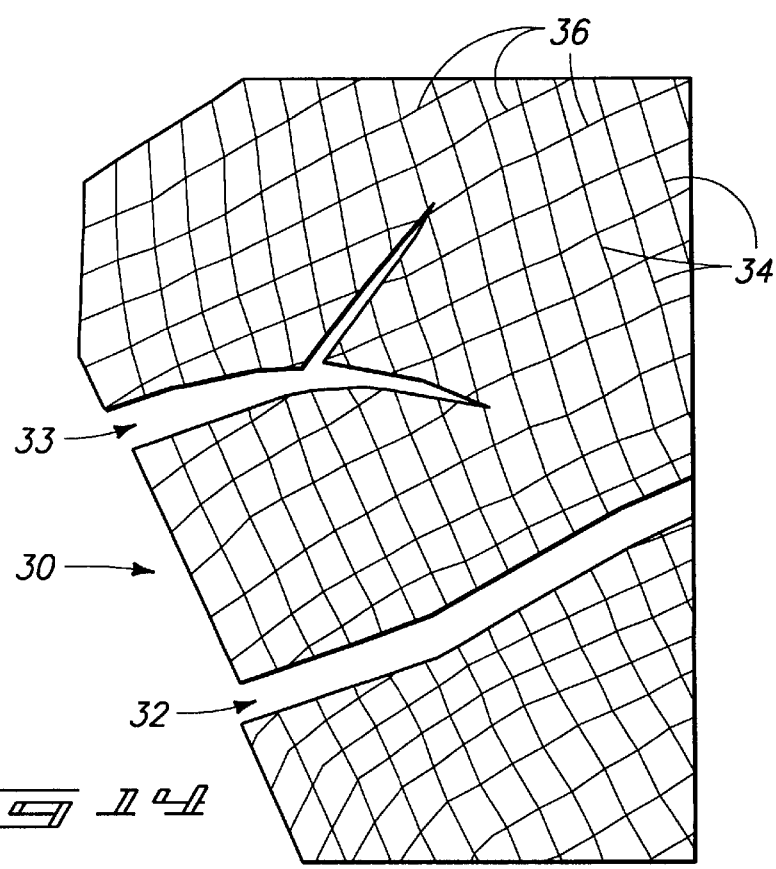
FIG. 14 is a detail of the upper left corner of the three dimensional surface of FIG. 13, shown as represented by a simplified mesh.

Let us now consider that the surface has linear discontinuities ("cuts"), and that we want the mapping function $\Phi$ to be continuous through these cuts. FIGS. 13 and 14 show good examples of such "cuts", while FIG. 8 shows the detail of such a cut, separating the surface S into two surfaces $S_1$ and $S_2$ along lines 18' and 18". In order to accommodate the discontinuity, the surface will be considered as a single patch (as it was before being "cut"). The set of constraints described below allows us to assign (u, v) coordinates to the vertices of the triangulation in such a way that the two borders of a cut are mapped to the same curve by the interpolated $\Phi$ mapping function. In other words, the cuts are "sewn" in (u, v) domain space (texture space).

As shown in FIG. 8, twin set of points $\{q_i, i=0 \ldots n\}$ and $\{\tilde{q}_i, i=0 \ldots n\}$ are sampled on the twin borders of the cut. We describe now how to make the mapping match at each pair $(q_i, \tilde{q}_i)$ of points. More precisely, we want to respect the following conditions:

$$\forall \nu \in \{u, v\} \left| \begin{array}{l} (1) \; \varphi_T^\nu(q_i) = \varphi_{\tilde{T}}^\nu(\tilde{q}_i) \\ (2) \; \mathrm{grad}\varphi_T^\nu = \mathrm{grad}\varphi_{\tilde{T}}^\nu \end{array} \right. \quad (20)$$

where T and $\tilde{T}$ denote the triangles containing $q_i$ and $\tilde{q}_i$ respectively. The gradient grad $\phi^\nu_T$ is computed as described in Section 3 (see Equation 5), using the basis shown in FIG. 4. Using the methods introduced in the previous two sections, one can translate these two conditions into the D.S.I. constraints $c^V_{q_i,\tilde{q}_i}$ and $c^{vW}_{q_i,\tilde{q}_i}$, given below in the equations 21 and 22 respectively.

$$\begin{cases} A_{c^\nu_{q_i,\tilde{q}_i}}(\alpha_j) = \lambda_j & \forall j \in \{0, 1\} \\ A_{c^\nu_{q_i,\tilde{q}_i}}(\tilde{\alpha}_j) = -\tilde{\lambda}_j & \forall j \in \{0, 1\} \\ A_{c^\nu_{q_i,\tilde{q}_i}}(\alpha_j) = 0 & \forall \alpha \notin \{\alpha_0, \alpha_1, \tilde{\alpha}_0, \tilde{\alpha}_1\} \\ b_{c^\nu_{q_i,\tilde{q}_i}}(\alpha_j) = 0 \end{cases} \quad (21)$$

where $\lambda_{j,j \in 0,1}$ and $\tilde{\lambda}_{j,j \in 0,1}$ denote the barycentric coordinates of $q_i$ in $[p(\alpha_0), p(\alpha_1)]$ and $\tilde{q}_i$ in $[p(\alpha_0), p\alpha_1)]$ respectively.

The four constraints $c^{uX}_{q_i,\tilde{q}_i}, c^{uY}_{q_i,\tilde{q}_i}, c^{vX}_{q_i,\tilde{q}_i}$ and $c^{vY}_{q_i,\tilde{q}_i}$ yielded by Equation 22 below ensure a constant gradient of the mapping through the cut. In other words, an isoparametric curve points in the same direction in the two corresponding triangles T and $\hat{T}$.

$$\begin{vmatrix} A_{c_{qi,\tilde{q}i}^{vw}}(\alpha_j) = D_j & \forall j \in \{0, 1, 2\} \\ A_{c_{qi,\tilde{q}i}^{vw}}(\tilde{\alpha}_j) = \delta_W \cdot \tilde{D}_j & \forall j \in \{0, 1, 2\} \\ A_{c_{qi,\tilde{q}i}^{vw}}(\alpha) = 0 & \forall \alpha \in \{\alpha_0, \alpha_1, \alpha_2, \tilde{\alpha}_0, \tilde{\alpha}_1, \tilde{\alpha}_2\} \\ b_{c_{qi,\tilde{q}i}^{vw}}(\alpha) = 0 & \end{vmatrix} \quad (22)$$

where:

$$v \in \{u, v\}; W \in \{X, Y\}; \delta_W = \begin{cases} -1 & \text{if } W = X \\ +1 & \text{if } W = Y \end{cases}$$

ALTERNATE EMBODIMENTS

In addition to the preferred embodiment described above wherein the invention comprises a method for building a global parameterization (u(x), v(x)) honoring constraints in a least square sense, the invention further includes a computer configured to perform the steps of the method. The computer comprises a memory, such as a disk drive, configured to store a series of computer executable instructions for performing the method, and a processor for processing the computer executable instructions. The computer can further comprise an output device for outputting the results after the method has been performed. The computer is configured to store in the memory a numerical representation of a two-dimensional feature (surface), as well as a three dimensional surface onto which the feature is to be mapped.

In yet another embodiment of the invention, the invention comprises a computer readable medium such as a magnetic disk, tape, or diskette onto which are stored a series of computer executable instructions for performing the steps of the method.

Yet another embodiment of the invention comprises a representation of a three dimensional surface mapped with a two-dimensional parametric feature (surface) using the method of the invention. Such may be for example a computer plot on paper or a screen display, or a file saved on a computer readable medium, which represents the surface.

EXAMPLES

Figure 9:
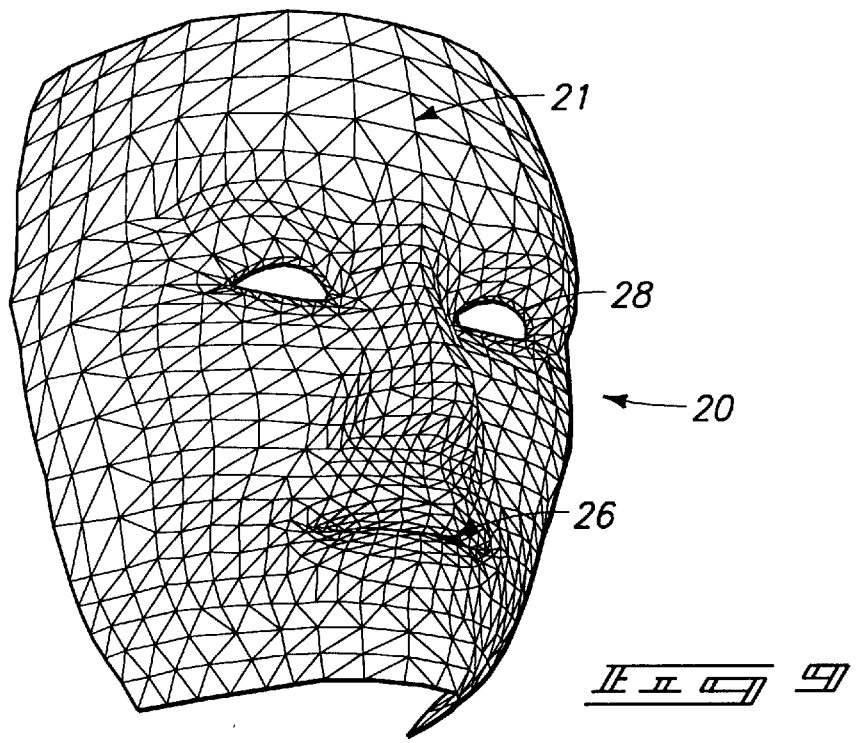
FIG. 9 is a diagram showing the representation of a three dimensional surface (a face) by a triangulated mesh.
Figure 10:
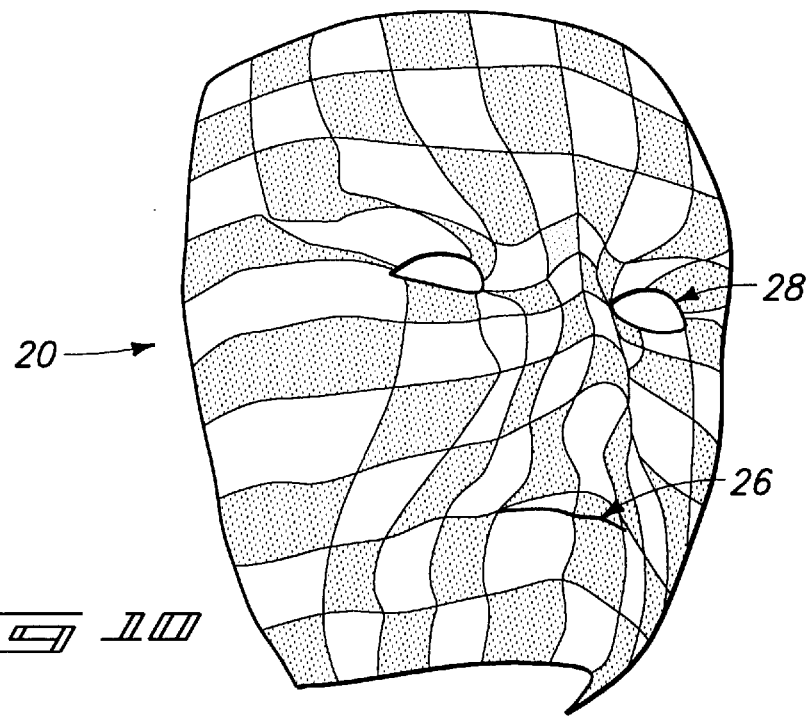
FIG. 10 is a diagram showing a texture mapped over the triangulated mesh surface of FIG. 9 wherein the isoparametric contour were plotted without the use of non-distortion constraints.
Figure 11:
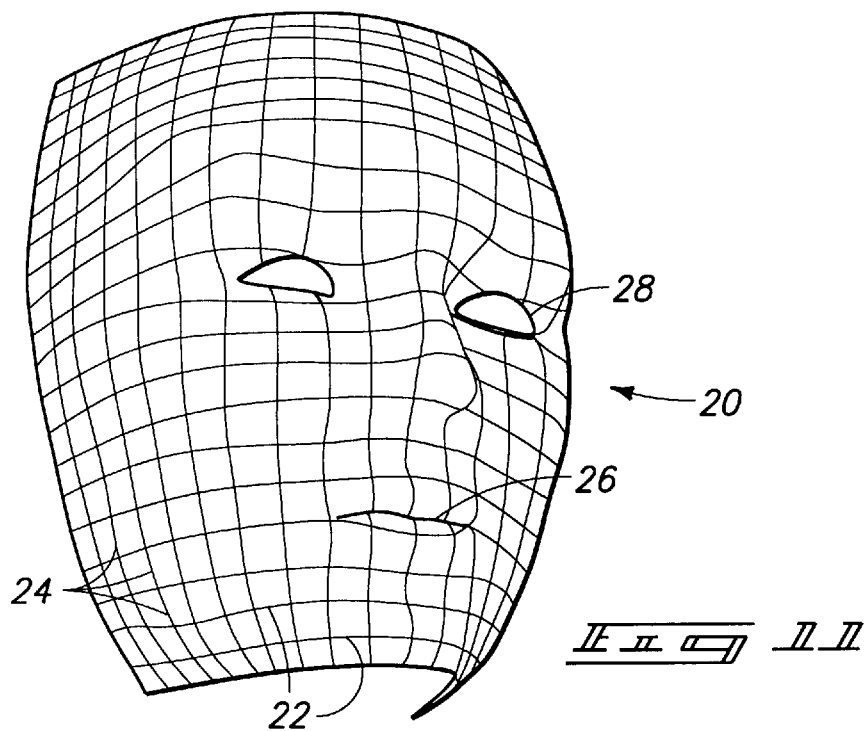
FIG. 11 is a diagram showing the representation of a three dimensional surface (a face) wherein orthogonality and homogeneity non-distortion constraints were used on the isoparametric contour lines.
Figure 12:
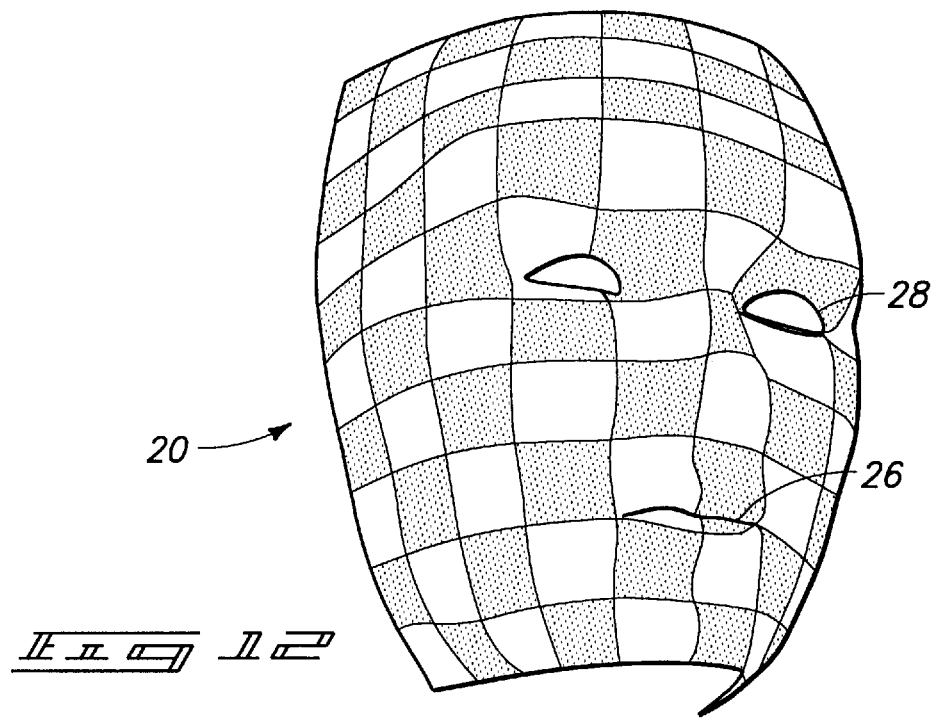
FIG. 12 is a diagram showing a texture mapped over the triangulated mesh surface of FIG. 11.

One can see in FIGS. 9–12 the results of the method applied to a triangulated mesh 21 representing a face 20 (see FIG. 9). The effect of the orthogonality and homogeneity constraints can be brought to the fore by comparing FIG. 10 (no constraint used) and FIG. 12 (orthogonality and homogeneity enforced), where a checker pattern is mapped to the mesh. The isoparametric curves corresponding to FIG. 12 are shown in FIG. 11, where one can see that the iso-u curves (exemplary lines 22, generally horizontal) are perpendicular to the iso-v curves (exemplary lines 24, generally vertical) at the intersections of the two curves. For all these FIGS. 9–12, the constraints ensuring the continuity of the mapping through cuts have been specified at the mouth 26 and the eyes 28 of the model. This model has 3000 triangles (FIG. 9), and has been parametrized after 100 iterations in approximatively one minute using a Sun R4000 workstation computer.

Industrial utility; applications

The methods described herein can be applied to problems other than those associated with texture mapping. For example, in the realm of geosciences, the methods described herein have been implemented into a geology oriented C.A.D. software program. Other exemplary applications include:

Unfolding surfaces representing the boundaries of geological layers while preserving the volume of the layers;

Generating grids suitable for finite elements analysis;

Beautifying triangulated meshes by remeshing in (u, v) domain space;

Constructing Spline surfaces from triangulated meshes; and

Performing computations such as geostatistical simulations in (u, v) domain space.

Not only do these applications highly desire that mappings present non-distorting properties, which is addressed by the method disclosed herein, but in addition, these applications can benefit from the ability of the disclosed method to take into account additional information expressed in the form of linear constraints.

Figure 15:
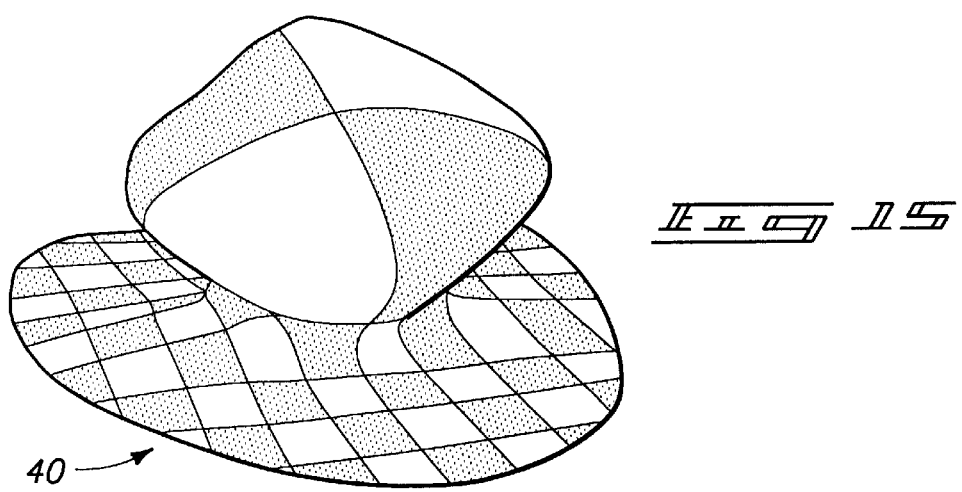
FIG. 15 is a diagram of a three dimensional model of a salt dome, showing a texture map where the orthogonality of the isoparametric curves is respected, but the sizes of the squares differ a great deal over the contoured surface of the salt dome.
Figure 16:
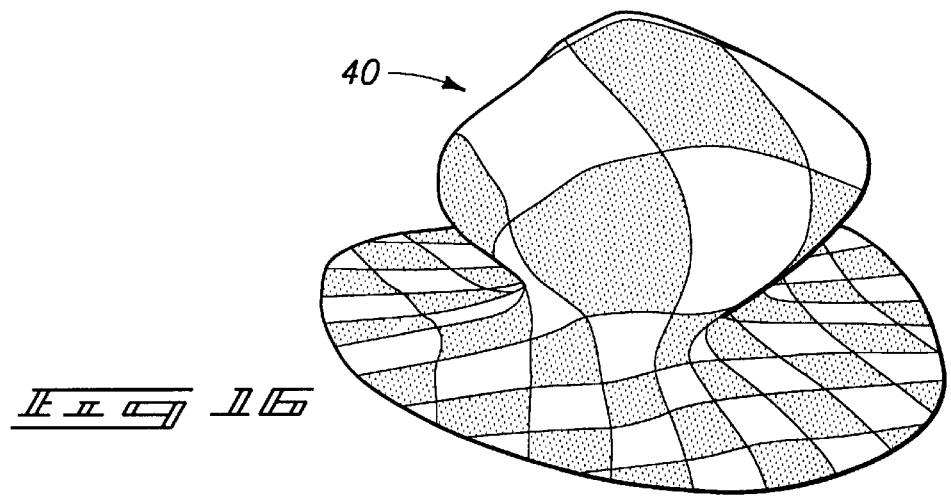
FIG. 16 is variation of the diagram of a three dimensional model of a salt dome shown in FIGS. 15 and 17, with an average solution between that shown for those two figures, and where the same weighting for the non-distortion criteria has been used for the two constraints (orthogonality and homogeneity) but with finer segments mapped over the contoured surface than in FIG. 15.
Figure 17:
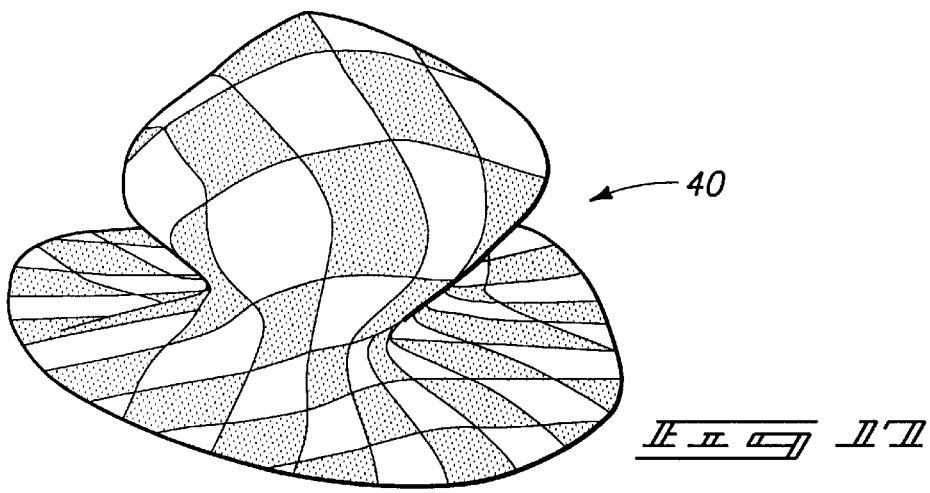
FIG. 17 is variation of the diagram of a three dimensional model of a salt dome shown in FIG. 15 and 16, but the squares have approximately the same size while the isoparametric curves are far from orthogonal as compared with FIG. 15.
Figure 18:
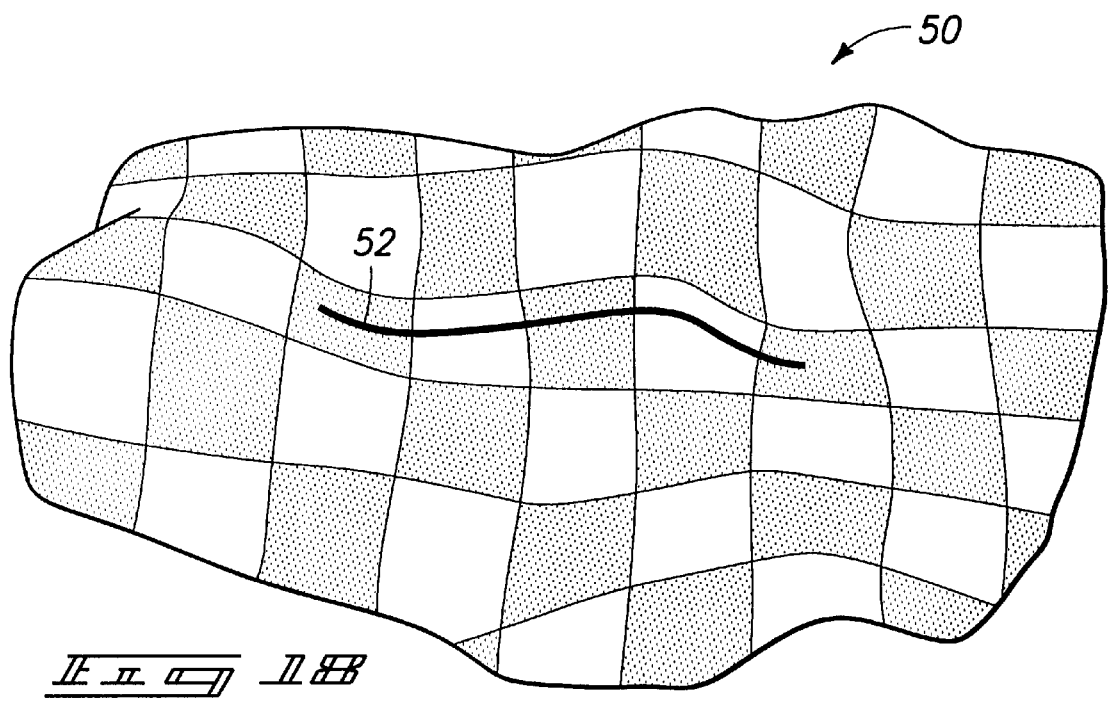
FIG. 18 is a diagram of a texture mapped three dimensional, contoured surface with an isoparametric curve and non-aligned texture.
Figure 19:
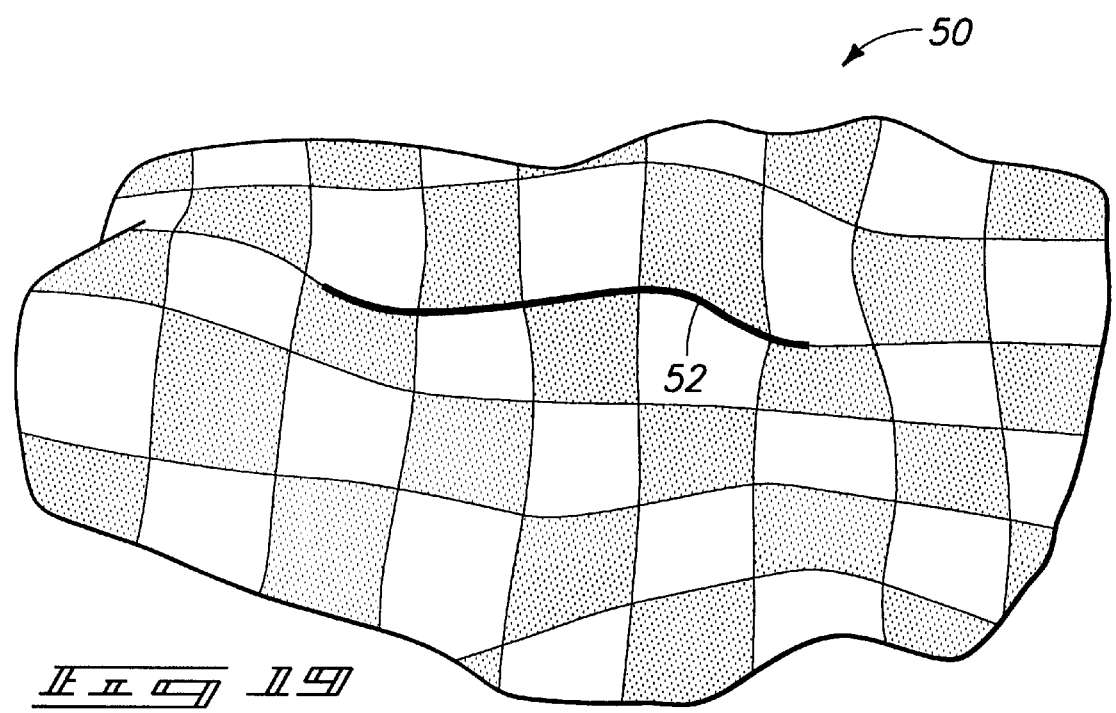
FIG. 19 is a variation of the texture mapped three dimensional surface of FIG. 18 with the texture matched to the isoparametric curve.

The method applied to geological data is demonstrated in FIGS. 13–19. In FIG. 13, one can see a mapping of a complex surface 30 having cuts 32, 33 and 34, corresponding to boundaries of a geological layer presenting faults. In FIG. 14, the isoparametric curves (exemplary lines 34 and 36) of the mapping are displayed, and one can see that the mapping is continuous through the cuts 32 and 33 of the surface 30. In FIGS. 15–17, a surface 40 representing a dome of salt is parametrized. For this kind of surfaces which are far from developable, distortions will still remain, and one can choose a compromise between the orthogonality and the homogeneity of the mapping by tuning the weightings $\omega_c$ of the two constraints. In FIG. 15, the orthogonality is respected, but the sizes of the squares differ a great deal, whereas in FIG. 17 the squares have approximatively the same size while the isoparametric curves are far from orthogonal. An average solution is shown in FIG. 16, where the same weighting has been used for the two constraints. One can see in FIG. 18 a mapped surface 50 with an isoparametric curve 52 specified. As shown in FIG. 19, the texture has been aligned to this curve 52. Such constitutes making the isoparametric curves C(u0) or C(v0) coincident with the curve 52. This is yet another method for honoring a linear constraint to reduce distortions in a mapped feature on a three-dimensional triangulated surface.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. Method for mapping a feature onto a simulated surface having contoured portions. The surface being definable by a plurality of generally adjacent triangulations defining border nodes and internal nodes on the surface, the surface being further definable by a plurality of intersecting isoparametric curves linking identified values of the feature to identified points on the surface, the isoparametric curves characterized in that when the surface is flat, the isoparametric curves intersect one another in a perpendicular manner at least at points proximate to at least some of the internal nodes, the method comprising maintaining the perpendicularity of the intersections of at least some of the isoparametric curves proximate to at least some of the internal nodes on the contoured portions of the surface.

2. Method for mapping a feature onto a simulated surface having contoured portions, the surface being definable by a plurality of generally adjacent triangulations, the surface being further definable by a plurality of intersecting isoparametric curves linking identified values of the feature to identified points on the surface, the isoparametric curves characterized in that when the surface is flat, the isoparametric curves are spaced a predetermined distance apart, the method comprising maintaining the predetermined spaced distance between at least some of the isoparametric curves on the contoured portions of the surface.

3. Method for mapping a feature onto a simulated surface, the surface being definable by a plurality of generally adjacent triangulations, the surface being further definable by a plurality of intersecting isoparametric curves linking identified values of the feature to identified points on the surface, the surface characterized by a defined secondary isoparametric curve projected onto the surface, the method comprising aligning at least one of the plurality of isoparametric curves to be coincident with the defined secondary isoparametric curve.

4. Method for mapping a feature onto a simulated surface having contoured portions, the surface being definable by a plurality of generally adjacent triangulations, each triangulation be defined by vertices terminating at points on the surface, the surface being further definable by a plurality of intersecting isoparametric curves linking identified values of the feature to identified points on the surface, the surface being characterized by a linear discontinuity such that a point on the surface along the discontinuity may be identified with two vertices of non-adjacent triangulations, the method comprising maintaining the identified value of the feature associated with a point on the surface along the discontinuity at the two both vertices.

5. Method for mapping a feature onto a simulated surface having contoured portions, the surface being definable by a plurality of generally adjacent triangulations, the surface being further definable by a plurality of intersecting isoparametric curves linking identified values of the feature to identified points on the surface, the isoparametric curves characterized by defined mathematical relationships comprising a plurality of variables associated with at least the topology of the surface, the method comprising holding at least one of the variables constant between isoparametric curves.

6. The method of claim 5 wherein each of the triangulations are characterized by vertices terminating at points on the surface, and wherein the method further comprises using the vertices to define a gradient of a mathematical function associated with the feature, which function is interpolated over the triangulated surface.

7. The method of claim 5 wherein the at least one variable is held constant to constrain the mapping of the values of the feature according to the equation $$\sum_{\alpha \in \Omega} \{A_{c^v}(\alpha) \cdot \varphi^v(\alpha)\} = b_{c^v} \qquad (10)$$

wherein $\alpha \in \Omega$ defines a set of the vertices, $v \in \{u, v\}$, $\{u, v\}$ being associated with coordinates for an identifiable feature value, $\phi^v$ is a discrete gradient function associating the vertices with the feature to be mapped to the surface, and the values $A_{c_v}(\alpha)$ and the scalar $b_{c_v}$ are constant given coefficients defining the constraint c.

8. The method of claim 6 further comprising the step of displaying the simulated surface.

9. An apparatus for generating a simulated topological surface having contoured portions and a feature mapped thereon, comprising a memory and a processor, wherein the surface is defined by surface database stored in the memory and representing a plurality of generally adjacent triangles having vertices and points at the vertices, and wherein the processor is configured to perform a series of computer executable steps, the steps comprising associating a feature value from a data base of feature values stored in the memory with ones of the points on the surface, defining a plurality of intersecting isoparametric curves linking identified feature values to identified points on the surface, the isoparametric curves characterized by defined mathematical relationships comprising a plurality of variables associated with at least the topology of the surface, holding at least one of the variables constant between isoparametric curves, and generating a representation of the surface having feature values constrained to the surface according to the isoparametric curves, and saving the representation in the computer memory.

* * * * *